United States Patent [19]

McMahon

[11] Patent Number: 4,689,484
[45] Date of Patent: Aug. 25, 1987

[54] PHOTOELECTRIC LEAK DETECTION SYSTEM FOR DOUBLE-WALLED TANKS AND THE LIKE

[76] Inventor: Robert L. McMahon, 232 Roundhill Pl., Clayton, Calif. 94517

[21] Appl. No.: 735,321

[22] Filed: May 17, 1985

[51] Int. Cl.⁴ .............................................. H01J 5/16
[52] U.S. Cl. .................................... 250/227; 250/577
[58] Field of Search ................. 250/227, 577; 73/293; 340/619; 356/133, 135–137

[56] References Cited

U.S. PATENT DOCUMENTS

| | | | |
|---|---|---|---|
| 3,995,168 | 11/1976 | Neuscheler et al. | 250/227 |
| 4,069,838 | 1/1978 | Hansel et al. | 250/577 |
| 4,118,634 | 10/1978 | Carvalko et al. | 73/293 |
| 4,155,013 | 5/1979 | Spiteri | 73/293 |
| 4,156,149 | 5/1979 | Vaccari | 250/577 |

Primary Examiner—David C. Nelms
Attorney, Agent, or Firm—Schapp and Hatch

[57] ABSTRACT

A photoelectric leak detector system for double-walled tanks and the like including a pair of optical fibers extending substantially from the top to the bottom of the annulus of the double-walled tank, a glass plate in contact with the lower ends of the optical fibers and spaced from the bottom of the annulus, a light source juxtaposed to the upper end of one of the optical fibers to pass light therethrough, and a photodiode juxtaposed to the upper end of the other optical fiber to detect changes in the reflected light issuing therefrom.

6 Claims, 4 Drawing Figures

PHOTOELECTRIC LEAK DETECTION SYSTEM FOR DOUBLE-WALLED TANKS AND THE LIKE

BACKGROUND OF THE INVENTION

1. Field of the Invention

The present invention relates to apparatus for detecting leaks in the inner tanks of double-walled tanks, and more particularly to photoelectric apparatus for detecting such leaks.

2. Description of the Prior Art (It is to be particularly noted that the term "prior art" as used herein or in any statement made by or on behalf of applicant means *only* that any document or thing referred to as prior art bears, directly or inferrentially, a date which is earlier than the effective filing date hereof.)

The recent general public awareness of the pervasiveness of the problem of storage tanks and the like leaking into public water supplies, aquifers, and the like, has brought about the development of many systems for detecting leakage from such tanks.

Some of these systems, however, are unnecessarily elaborate and expensive or difficult to retrofit to existing tanks or are otherwise not well adapted to use in connection with particular types of tanks or particular stored fluids.

SUMMARY OF THE INVENTION

Accordingly, it is an object of the present invention to provide systems for detecting leaks in double-walled tanks and the like in which the parts mounted in the tank itself are simple, rugged, and easily maintained.

Another object of the present invention is to provide systems for the detection of leaks in double-walled tanks and the like which are easily retrofitted to existing tanks.

Yet another object of the present invention is to provide systems for detecting leaks in double-walled tanks and the like in which all of the parts mounted in or upon the tank itself are readily accessable for inspection, maintenance, and repair.

A further object of the present invention is to provide systems for detecting leaks in double-walled tanks and the like in which all electrical parts are completely isolated from the potentially explosive vapors of stored fluids which leak into the interspace between the inner tank and the outer tank.

Other objects of the present invention will in part be obvious and will in part appear hereinafter.

The present invention, accordingly, comprises the apparatus embodying features of construction, combinations of elements, and arrangements of parts, all as exemplified in the following disclosure, and the scope of the present invention will be indicated in the appended claims.

In accordance with a principal feature of the present invention a photoelectric leak detector for a double-walled tank or the like comprises a plurality of optical fibers extending substantially from the top to the bottom of the annulus of the tank.

In accordance with another principal feature of the present invention the lower ends of said optical fibers are contacted by a body of transparent material and the lower surface of said body of transparent material is spaced by a small distance from the bottom of said annulus.

In accordance with yet another principal feature of the present invention a light source and a photodetector are respectively juxtaposed to the upper ends of said optical fibers, and said photodetector is incorporated into one arm of a bridge circuit by means of which small changes in the amount of light reflected from the lower surface of said body of transparent material, occasioned by the contact of leakage fluid therewith, are easily detected.

In accordance with a still further principal feature of the present invention said optical fibers and said body of transparent material are sealingly mounted in said annulus, whereby said light source and said photodetector are isolated from vapors of leakage fluid which may come to exist in said annulus.

For a fuller understanding of the nature and objects of the present invention reference should be had to the following detailed description, taken in connection with the accompanying drawing.

DESCRIPTION OF THE PREFERRED EMBODIMENT

Figure 1:
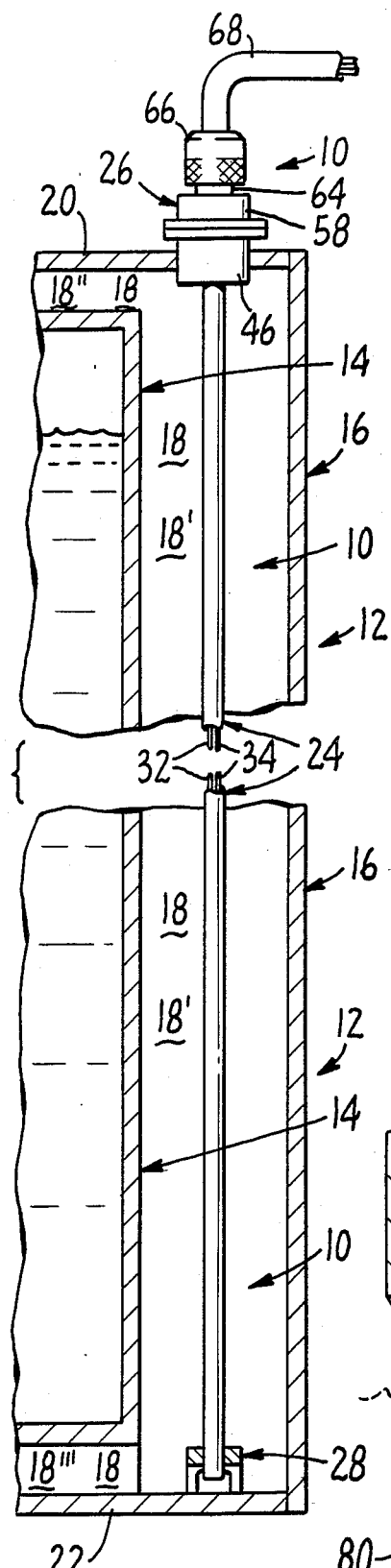
FIG. 1 is an elevational view, partially in section, of a double-walled tank in which is mounted a part of a photoelectric leak detector constructed in accordance with the present invention.

Referring now to FIG. 1, there is shown a photoelectric leak detector 10 constructed in accordance with the preferred embodiment of the present invention, disposed in its operative position in a conventional double-walled tank 12.

In the well known manner, double-walled tank 12 comprises an inner tank 14 and an outer tank 16; inner tank 14 being so disposed within outer tank 16 as to define an interspace 18 therebetween which itself consists of an annular space or annulus 18', an upper discoid space 18'', and a lower discoid space 18'''.

As further seen in FIG. 1, outer tank 16 comprises a top plate 20 and a bottom plate 22. It is to be understood, however, that the present invention is not limited in its scope of application to any particular type of double-walled tank.

As also seen in FIG. 1, leak detector 10 is comprised of three main parts, viz., a light conduit 24, a photoelectric coupling head 26, and an optical pickup head 28.

Figure 2:
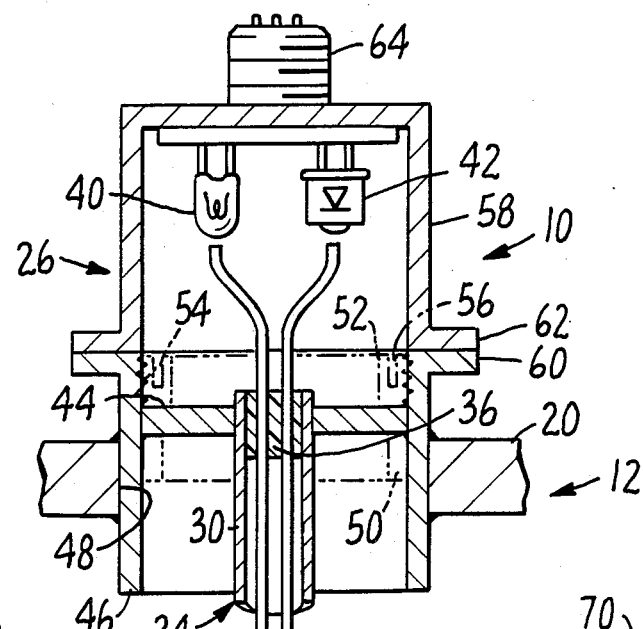
FIG. 2 is an elevational view, partly in section, of the upper end of the photoelectric leak detector apparatus of the present invention shown in FIG. 1.
Figure 3:
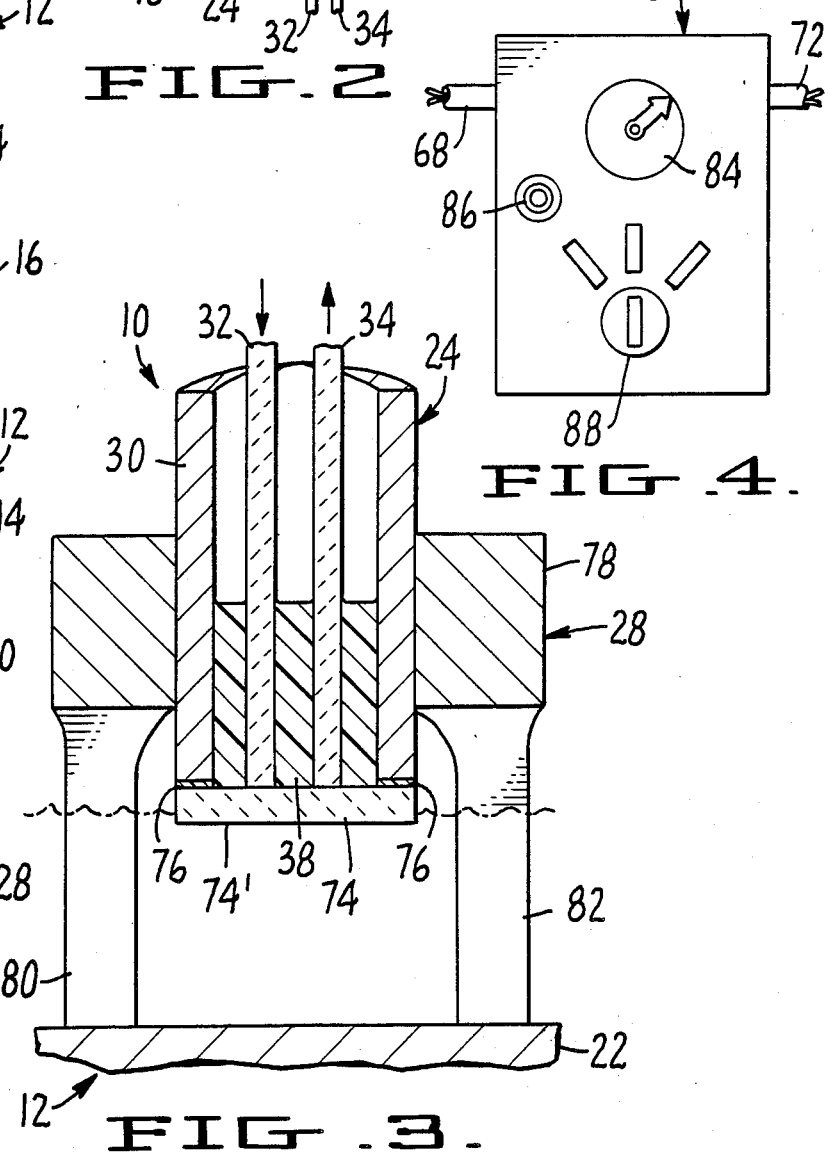
FIG. 3 is an elevational view, partly in section, of the lower end of the part of said leak detector system of the present invention which is shown in FIG. 1.

As may be seen by comparison of FIGS. 2 and 3, light conduit 24 is comprised of an outer protective tube 30 and two optical fibers 32, 34 contained within outer tube 30.

Outer tube 30 may, for example, be a one-fourth inch stainless steel tube, and optical fibers 32, 34 may both be two millimeter diameter plastic optical fibers of the now well known type. Further, in accordance with the teachings of the present invention, optical fibers 32, 34 are optically isolated from each other, so that there is no leakage of light flux from one optical fiber to the other. This may be accomplished in the well known manner, by providing an opaque coating on the outer, cylindrical surface of at least one of the optical fibers 32, 34, or, in some cases, merely by assuring that these optical fibers do not touch each other or come into close mutual proximity.

Yet further, in accordance with the present invention, both ends of each optical fiber 32, 34 are optically polished in the well known manner. Additionally, the interior of outer tube 30 is sealed against the intrusion of the outside atmosphere by means of plugs 36 (FIG. 2) and 38 (FIG. 3) of potting compound, which, at their respective ends of tube 30 completely fill the space between tube 30 and the optical fiber ends contained therein.

Referring now to FIG. 2, it will be seen that the upper ends of optical fibers 32, 34 extend through plug 36, and terminate in close proximity to an incandescent lamp 40 and a photodiode 42, respectively. Additional supporting means for supporting the upper extremities of optical fibers 32, 34 in close proximity to incandescent lamp 40 and photodiode 42, respectively, will be provided by those having ordinary skill in the art, informed by the present disclosure, without the exercise of invention, but have been deleted from the present drawings for clarity of illustration.

As further seen in FIG. 2, the upper end of outer tube 30 is close-fittingly received in a central hole in a disk 44 of suitable metalic material and sealingly affixed therein, as by cementing.

Disk 44 is close-fittingly received in a pipe fitting or the like 46 and sealingly affixed therein at the location illustrated in FIG. 2, as by cementing.

As also seen in FIG. 2, pipe fitting 46 is itself sealingly affixed in a suitable, close-fitting opening 48 in top plate 20.

It is to be understood, however, that in certain preferred embodiments of the present invention the upper end of outer tube 30 will be removably affixed to pipe fitting 46, rather than being permanently affixed thereto.

Thus, in one of said certain preferred embodiments, as shown in phantom in FIG. 2, the outer edge of disk 44 is not directly affixed to the inner wall surface of pipe fitting 46, but rather is clamped between a fixed flange 50, which is a metallic ring brazed to the inner wall surface of pipe fitting 46, and a nut 52, which is a metallic ring provided on its outer surface with threads adapted to interengage with threads cut in the inner wall surface of the end portion of pipe fitting 46. Nut 52 will preferably be provided with suitable notches 54, 56 adapted to coact with a suitable spanner in snugging nut 52 against the top of disk 44.

Other means for removably affixing the upper end of outer tube 30 in pipe fitting 46, and at the same time isolating the electrical components of the system from vapors of volatile fluids in the interspace, will be provided by those having ordinary skill in the art, informed by the present disclosure, without the exercise of invention, and all such means fall within the scope of the present invention.

Further, in accordance with the teachings of the present invention, it is to be preferred that any such removable affixing or demounting means be so constructed and arranged that tube 30 and optical pickup head 28 can be completely removed from interspace 18 through pipe fitting 46, for inspection, cleaning, repair, and the like.

Thus, in that certain preferred embodiment shown in phantom in FIG. 2 it is preferable that the inner diameter of flange 50 be large enough so that optical pickup head 28 can pass therethrough.

Returning to FIG. 2, it will be seen that a generally cylindrical housing 58 is disposed upon the upper end of pipe fitting 46, and that the adjacent ends of pipe fitting 46 and housing 58 are provided with registering flanges 60, 62.

Suitable locking means are provided for locking flanges 60, 62 together in the mutually abutting relationship shown in FIG. 2. Such locking means are not shown or described herein, however, because they do not constitute a part of the present invention. Similarly, suitable gas or vapor leak sealing means, such as neoprene O-rings, may be provided for coaction with both flanges 60 and 62 and disk 44 and its associated nut 52, but such expedients are not shown and described herein because such expedients are old and well known and not a part of the present invention.

As also seen in FIG. 2, incandescent lamp 40 and photodiode 42 are both mounted in housing 58 in such a way as to be properly juxtaposed to their respective cooperating optical fibers 32, 34 when housing 58 is locked to pipe fitting 46 in the mutual abutting relationship illustrated in FIG. 2. The provision of suitable aligning pins or the like for assuring that housing 58 must be properly locked to pipe fitting 46 to correctly align the ends of optical fibers 32, 34 with lamp 40 and photodiode 42, respectively, is within the scope of one having ordinary skill in the art, and thus no such expedients are shown or described herein.

A cable connector 64 of well known type is sealingly affixed in a suitable opening in the upper face of housing 58, and is provided with a plurality of contacts each of which is connected to a corresponding one of the leads of lamp 40 and photodiode 42.

As seen in FIG. 1, cable connector 64 is adapted to coact, in the well known manner, with a cable connector 66 which is itself affixed to one end of a cable 68, and provided with contacts connected respectively to the conductors of cable 68. Thus, it will be understood that when cable connector 68 is engaged with cable connector 64 in the well known manner, the leads of lamp 40 and photodiode 42, respectively, are connected with corresponding connectors of cable 68. In the preferred embodiment, lamp 40 may be a tungsten-halogen lamp, in which case it is to be understood that the corresponding conductors of cable 68 must be of sufficiently large cross-sectional diameter as to provide suitable current carrying capacity.

Figure 4:
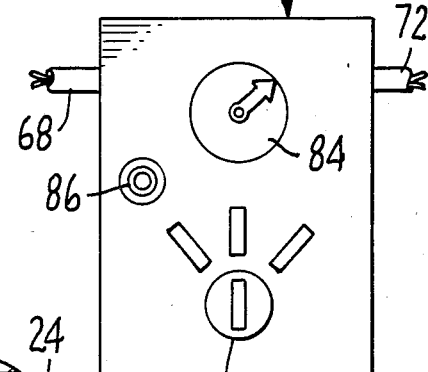
FIG. 4 is an elevational view of the signal utilization device which comprises part of the photoelectric leak detector system illustrated in FIGS. 1, 2, and 3.

As seen in FIG. 4, cable 68 extends to a suitable signal utilization device 70, which is itself supplied with 115 volt alternating current via a cable 72 if lamp 40 is an incandescent lamp. It is to be understood, however, that the present invention is not limited to photoelectric leak detector systems in which the light source is an incandescent lamp.

Referring now to FIG. 3, optical pickup head 28 of leak detector 10 of the preferred embodiment of the present invention is shown in detail.

As seen in FIG. 3, optical pickup head 28 includes the lower end of tube 30 and the lower ends of the optical fibers 32, 34 contained therein, along with the associated plug 38 of potting compound or the like.

As also seen in FIG. 3, a glass plate 74 is affixed to the lower end of tube 30, as by means of a suitable body of adhesive 76.

It is to be particularly noted that the polished lower ends of optical fibers 32, 34 bear directly upon the upper face of glass plate 74 and that steps are taken to assure that none of the potting compound of plug 38 nor the adhesive 76 is interposed between glass plate 74 and the optical fibers 32, 34.

It is to be further noted that both the upper and lower faces of glass plate 74 are polished, and that neither of these faces is coated with an opaque or light-blocking coating or the like.

Optical pickup head 28 further comprises a flange ring 78 which is suitably affixed to tube 30, as by brazing.

As also seen in FIG. 3, a pair of spacing legs 80, 82 are affixed to ring 78 in such a manner that they serve to space glass plate 74 from the bottom plate 22 of outer tank 16 by a predetermined distance.

Other spacing means for spacing glass plate 74 and the lower end of light conduit 24 from the bottom of the associated outer tank will be provided by those having ordinary skill in the art without the exercise of invention, and the present invention is not limited to the particular spacing arrangement, including ring 70 and legs 80, 82, shown in FIG. 3.

Referring now to FIG. 4, it will be seen that the signal utilization device 70 which is associated with lamp 40 and photodiode 42 by way of cable 68 comprises a meter 84, a knob 86 for manipulating a variable resistor or the like, and a selector switch for manually selecting various states of operation of signal utilization device 70.

In the preferred embodiment signal utilization device 70 comprises a bridge circuit of well known type one arm of which comprises photodiode 42 and the opposite arm of which comprises the said variable resistor, the value setting of which is determined by the rotational position of knob 86.

Meter 84 is connected across the terminals of said bridge circuit remote from those to which the bridge exciting voltage is applied, and thus meter 84 can be brought to its zero reading, or another selected reading, for any value of light flux received by photodiode 42, by manipulating knob 86 in the well known manner.

By thus utilizing the well known principles of the bridge circuit, signal processing device 70 can be made a very sensitive detector of any change in the light flux received by photodiode 42 from a selected value.

It is to be understood, however, that the present invention is not limited to the employment of a bridge circuit in its signal utilization device.

Signal utilization device 70 further comprises suitable circuit means for converting the 115 volt alternating current received via cable 72 to a suitable exciting voltage for said bridge circuit, and further suitable circuit means, including selector switch 88, for manually selecting such modes of operation as a power off mode, an operation checking mode, a lamp voltage adjusting mode, and a bridge operating mode, all of which further suitable circuit means will be provided by those having ordinary skill in the art without the exercise of invention.

As will now be evident to those having ordinary skill in the art, informed by the present disclosure, the double-walled tank leak detector system of the present invention operates by detecting the change in the amount of light internally reflected from the lower surface of glass plate 74, which itself varies when the surface of leakage fluid accumulating in the bottom of interspace 18 rises sufficiently to contact the lower face of glass plate 74.

It has been discovered in empirically verifying the principles of the present invention that the change in internal reflectivity of the lower face of glass plate 74 is sufficient to provide a clearly perceptible reading of meter 84, trip an alarm circuit of well known type, or produce other indication or action, even when the leakage fluid is partially transparent.

It will thus be seen that the objects set forth above, among those made apparent from the preceeding description, are efficiently attained, and since certain changes may be made in the above constructions and the method carried out thereby without departing from the scope of the present invention it is intended that all matter contained in the above description are shown in the accompanying drawing will be interpreted as illustrative only, and not in a limiting sense.

It has also been determined in reducing the present invention to practice that a leak detection system of the present invention can be calibrated in accordance with the reflectivity of a particular liquid, so that an indication can be had of the leaking of that particular liquid or any liquid of the same reflectivity. For example, a system of the present invention can be so calibrated that leakage of the particular liquid stored in the associated tank can be distinguished from leakage of other liquids, e.g., ground water, of different reflectivity, into the annulus of that tank. By this means the necessary corrective action can be more accurately determined, more quickly and at far lower cost than is the case with many prior art systems.

Further, as will be obvious to those having ordinary skill in the art, informed by the present disclosure, the length of the legs 80, 82, etc., of FIG. 3, or the like, may be varied, and thus the distance between the upper surface of bottom tank wall 22 and the lower surface 74' of plate 74 varied, so that the volume of leakage fluid in the interspace can be roughly determined when the rising leakage fluid level reaches lower surface 74'.

It is also to be understood that the following claims are intended to cover all of the generic and specific features of the invention herein described, and all statements of the scope of the invention which, as a matter of language, might be said to fall therebetween.

What is claimed is:

1. A photoelectric leak detector for a double-walled tank or the like, comprising:
   a plurality of optical fibers extending substantially from the top to the bottom of the annulus of said double-walled tank;
   a body of transparent material having an upper surface in contact with the lower ends of said optical fibers and a lower surface spaced from the bottom of said annulus;
   a light source juxtaposed to the upper end of at least one of said optical fibers; and
   a photodetector juxtaposed to the upper end of at least one other one of said optical fibers.

2. A photoelectric leak detector as claimed in claim 1, further comprising a protective tube surrounding and containing said optical fibers, said body of transparent material being affixed to the lower end of said protective tube.

3. A photoelectric leak detector as claimed in claim 2, further comprising spacing means for spacing the lower end of said tube from the bottom of said annulus.

4. A photoelectric leak detector as claimed in claim 1 in which said optical fibers pass through an opening at the top of said annulus and said optical fibers are completely removable from said annulus via said opening.

5. A photoelectric leak detector as claimed in claim 3 in which said optical fibers pass through an opening at the top of said annulus and said protective tube and body of transparent material are completely removable from said annulus via said opening.

6. The method of detecting leaks in the inner wall of a double-walled tank, comprising the steps of:

installing in the annulus of said double-walled tank a plurality of optical fibers extending substantially from the top to the bottom of said annulus, said optical fibers terminating at a body of transparent material the lower surface of which is spaced from the bottom of said annulus;

passing light down at least one of said optical fibers to said body of transparent material; and detecting the light received at the upper end of at least one other one of said optical fibers, whereby to determine the presence of leakage fluid between the inner and outer walls of said double-walled tank.

* * * * *